United States Patent
Sun et al.

(10) Patent No.: US 12,119,901 B2
(45) Date of Patent: Oct. 15, 2024

(54) PRECODING VECTOR BASED ON SINGULAR VALUE DECOMPOSITION CHARACTERIZATION OF A COMMUNICATION CHANNEL

(71) Applicant: QUALCOMM Incorporated, San Diego, CA (US)

(72) Inventors: Jing Sun, San Diego, CA (US); Raviteja Patchava, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 18/162,443

(22) Filed: Jan. 31, 2023

(65) Prior Publication Data
US 2024/0259056 A1    Aug. 1, 2024

(51) Int. Cl.
*H04B 7/0456*    (2017.01)
*H04B 7/22*    (2006.01)

(52) U.S. Cl.
CPC ............. *H04B 7/0456* (2013.01); *H04B 7/22* (2013.01)

(58) Field of Classification Search
CPC ................................. H04B 7/0456; H04B 7/22
See application file for complete search history.

(56) References Cited

U.S. PATENT DOCUMENTS

| | | | |
|---|---|---|---|
| 6,437,733 B1 * | 8/2002 | Selva Vera ........... | H04B 7/0845 342/453 |
| 2016/0212643 A1 * | 7/2016 | Park ...................... | H04B 7/0478 |
| 2021/0385624 A1 * | 12/2021 | Lin ........................ | H04W 4/029 |

* cited by examiner

*Primary Examiner* — Sung S Ahn
(74) *Attorney, Agent, or Firm* — Harrity & Harrity, LLP

(57) ABSTRACT

Various aspects of the present disclosure generally relate to wireless communication. In some aspects, a network entity may obtain a singular value decomposition (SVD) precoding vector that is based at least in part on backscatter associated with a reference signal transmitted by the network entity. The network entity may apply the SVD precoding vector to an output signal. The network entity may transmit the output signal based at least in part on a set of antennas. Numerous other aspects are described.

30 Claims, 10 Drawing Sheets

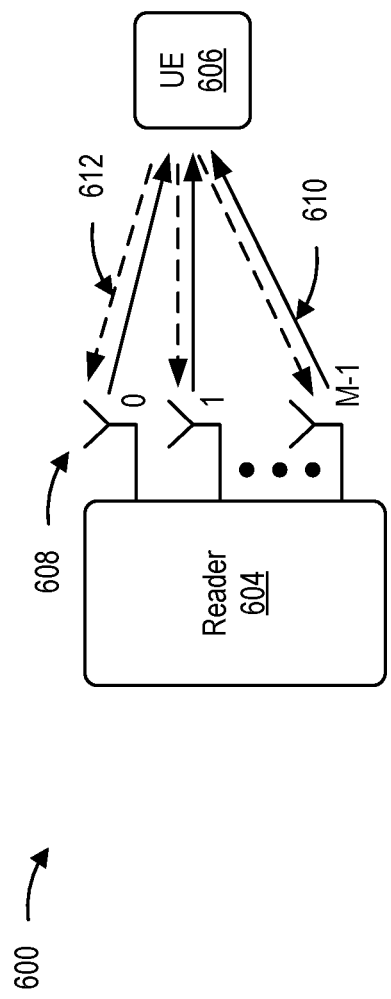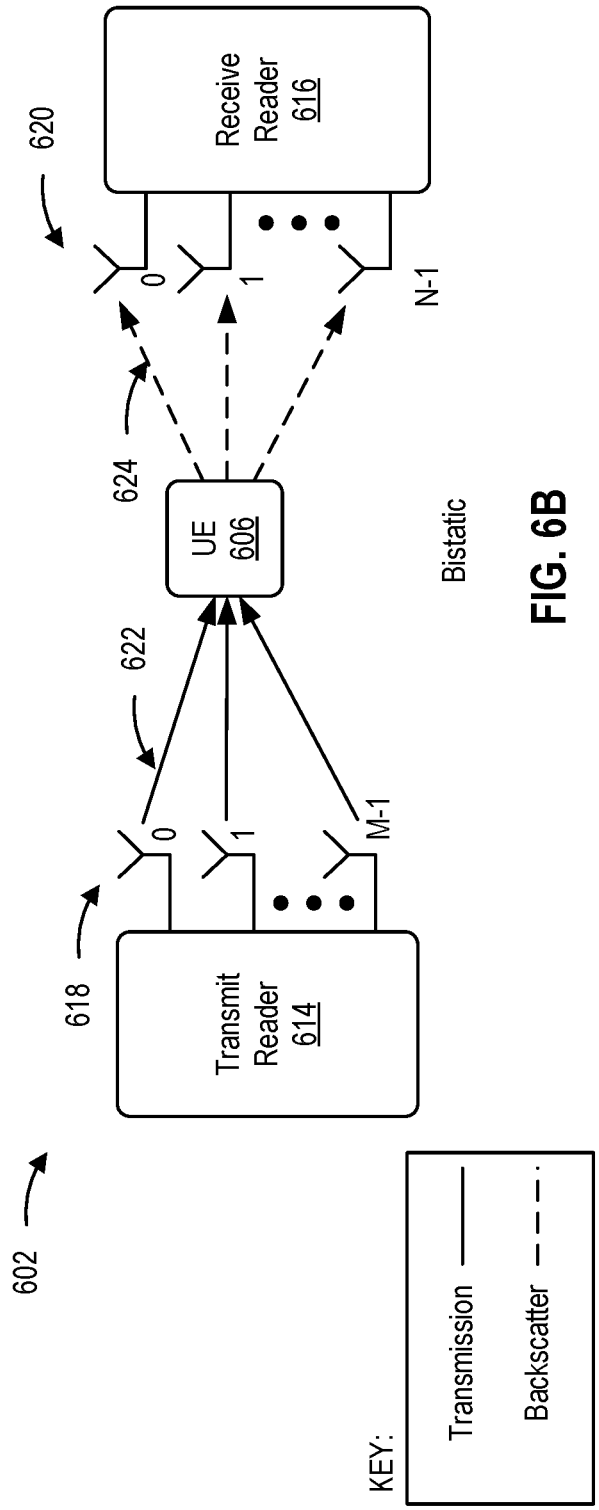
FIG. 6A Monostatic
FIG. 6B Bistatic

PRECODING VECTOR BASED ON SINGULAR VALUE DECOMPOSITION CHARACTERIZATION OF A COMMUNICATION CHANNEL

FIELD OF THE DISCLOSURE

Aspects of the present disclosure generally relate to wireless communication and to techniques and apparatuses for a precoding vector that is based on singular value decomposition characterization of a communication channel.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a network entity. The method includes obtaining a singular value decomposition (SVD) precoding vector that is based at least in part on backscatter associated with a reference signal transmitted by the network entity. The method may include applying the SVD precoding vector to an output signal. The method may include transmitting the output signal based at least in part on a set of antennas.

Another aspect provides a method for wireless communication by a network entity. The method includes receiving backscatter associated with a reference signal. The method may include generating an SVD precoding vector based at least in part on the backscatter.

Other aspects provide: an apparatus operable, configured, or otherwise adapted to perform any one or more of the aforementioned methods and/or those described herein with reference to and as illustrated by the drawings and specification; a non-transitory, computer-readable medium comprising computer-executable instructions that, when executed by a processor of an apparatus, cause the apparatus to perform the aforementioned methods and/or those described herein with reference to and as illustrated by the drawings and specification; a computer program product embodied on a computer-readable storage medium comprising code for performing the aforementioned methods and/or those described herein with reference to and as illustrated by the drawings and specification; and/or an apparatus comprising means for performing the aforementioned methods and/or those described herein with reference to and as illustrated by the drawings and specification. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A and 6B are diagrams illustrating a first example and a second example, respectively, of a multi-antenna reader channel model that is based at least in part on backscatter, in accordance with the present disclosure.

DETAILED DESCRIPTION

Figure 1:
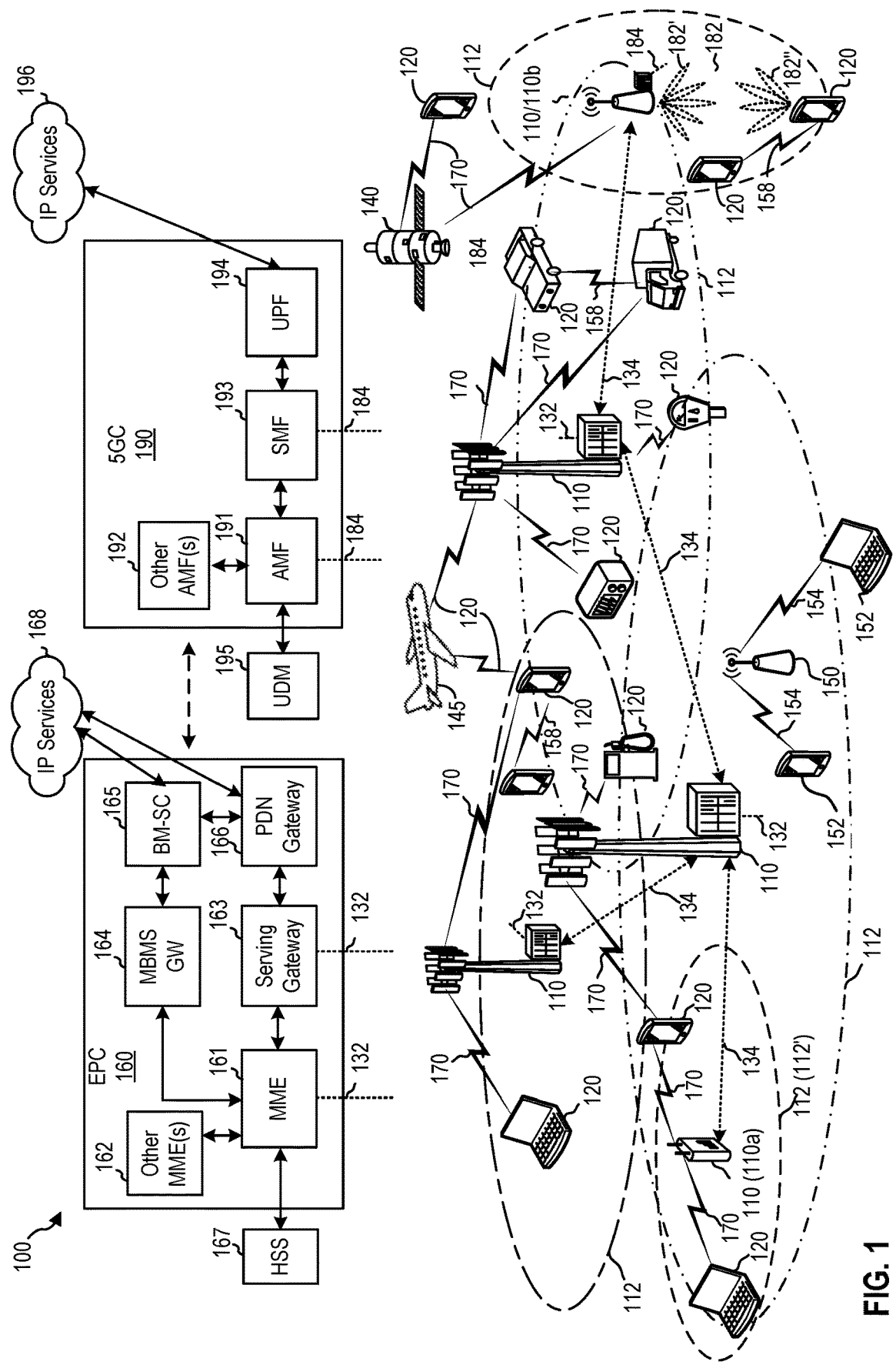
FIG. 1 depicts an example of a wireless communications network, in accordance with the present disclosure.

Aspects of the present disclosure provide apparatuses, methods, processing systems, and computer-readable mediums for a precoding vector that is based on singular value decomposition characterization of a communication channel.

Some wireless communication devices may be considered Internet-of-Things (IoT) devices. A passive IoT device may be an IoT device that accumulates energy from radio signaling (also referred to as energy harvesting and/or power harvesting). The passive IoT device may not include a battery but, in some aspects, may include a battery to store harvested energy. How a wireless communication system communicates with a passive IoT device may result in inefficient power harvesting by the passive IoT device. As one example, higher frequencies associated with some wireless communication systems (e.g., above 6 Gigahertz (Hz)) may be more susceptible to multi-path fading that results in a decreased received signal power level, a decreased input signal power level to the power harvester, and/or a reduced operating range of the passive IoT device.

In some aspects, a transmitting device may transmit a reference signal toward a passive IoT device, and the passive IoT device may generate backscatter by reflecting the reference signal. A receiving device, which may be integrated with the transmitting device or separate from the transmitting device, may generate a singular value decomposition (SVD) precoding vector by generating a channel estimation matrix of one or more communication channels (e.g., between the transmitting device, the passive IoT device, and/or the receiving device) using the backscatter. The receiving device may compute the SVD precoding vector using the channel estimation matrix and an SVD representation of the communication channel(s). The receiving device may indicate the SVD precoding vector to the transmitting device, and the transmitting device may apply the SVD precoding vector to multiple signals associated with a multiple antenna transmission (e.g., a multiple-input-single output (MISO) transmission) directed to the passive IoT.

Backscatter that is generated from a reference signal may be used by a device to compute a channel estimation and generate an SVD precoding vector. Applying the SVD precoding vector to a MIMO transmission and/or MISO transmission at a transmitting device may improve a signal quality of the MIMO transmission (and/or MISO transmission) at a passive UE, such as by increasing a received power level of the MIMO transmission and/or reducing fading in the MIMO transmission. The improved received signal quality may enable a passive UE to harvest power and/or energy in wireless communications systems that operate at higher frequencies and/or increase an operating range of the passive UE from the network entity.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110*a* may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
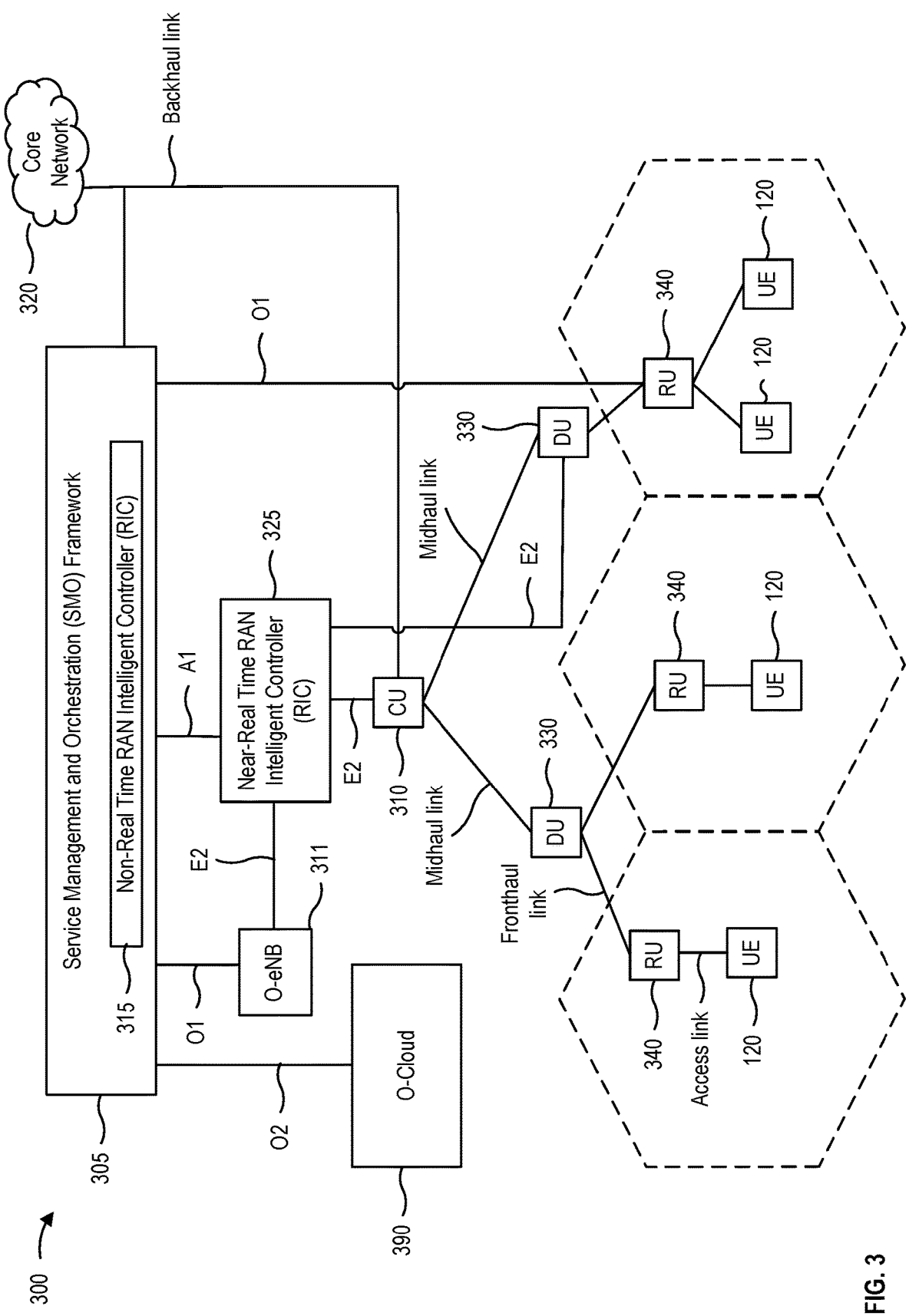
FIG. 3 depicts an example disaggregated base station architecture.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated radio access network architecture, such as an Open RAN (O-RAN) architecture or a Virtualized RAN (VRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3rd Generation Partnership Project (3GPP) currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mm Wave or near mmWave radio frequency bands (e.g., a mmWave base station such as BS 110*b*) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHZ, 20 MHz, 100 MHz, 400 MHZ, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110*b* in FIG. 1) may utilize beamforming with a UE 120 to improve path loss and range, as shown at 182. For example, BS 110*b* and the UE 120 may each include a plurality of antennas, such as antenna elements, antenna panels, and/or antenna arrays to facilitate the beamforming. In some cases, BS 110*b* may transmit a beamformed signal to UE 120 in one or more transmit directions 182'. UE 120 may receive the beamformed signal from the BS 110*b* in one or more receive directions 182". UE 120 may also transmit a beamformed signal to the BS 110*b* in one or more transmit directions 182". BS 110*b* may also receive the beamformed signal from UE 120 in one or more receive directions 182'. BS 110*b* and UE 120 may then perform beam training to determine the best receive and transmit directions for each of BS 110*b* and UE 120. Notably, the transmit and receive directions for BS 110*b* may or may not be the same. Similarly, the transmit and receive directions for UE 120 may or may not be the same.

Wireless communications network 100 further includes a Wi-Fi access point (AP) 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QOS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
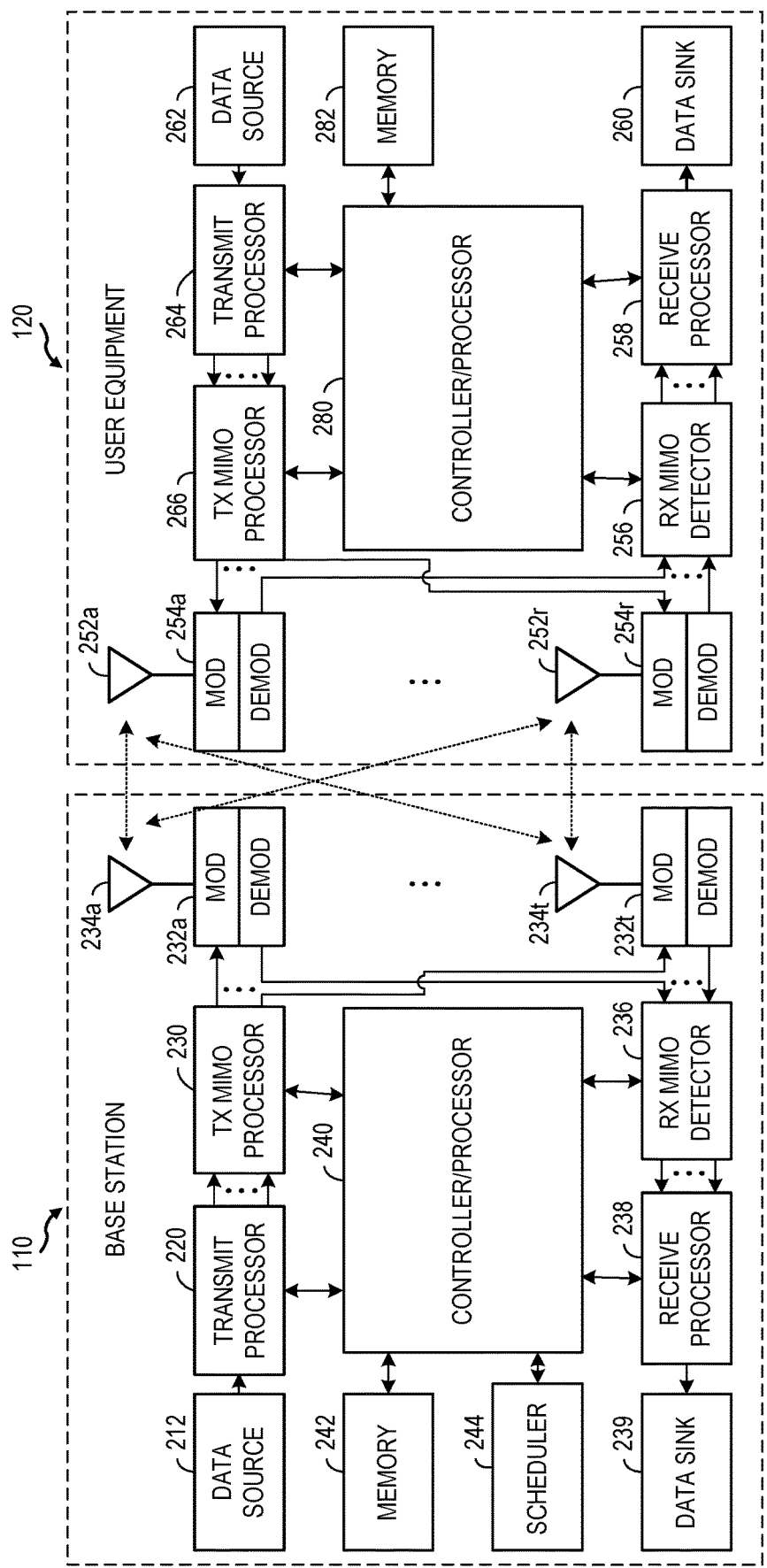
FIG. 2 depicts aspects of an example network entity and UE, in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

UE 120 includes antennas 252*a*-252*r* that may receive the downlink signals from the BS 110 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for a physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 110.

At BS 110, the uplink signals from UE 120 may be received by antennas 234a-234t, processed by the demodulators in transceivers 232a-232t, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, receive (RX) MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network entity) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
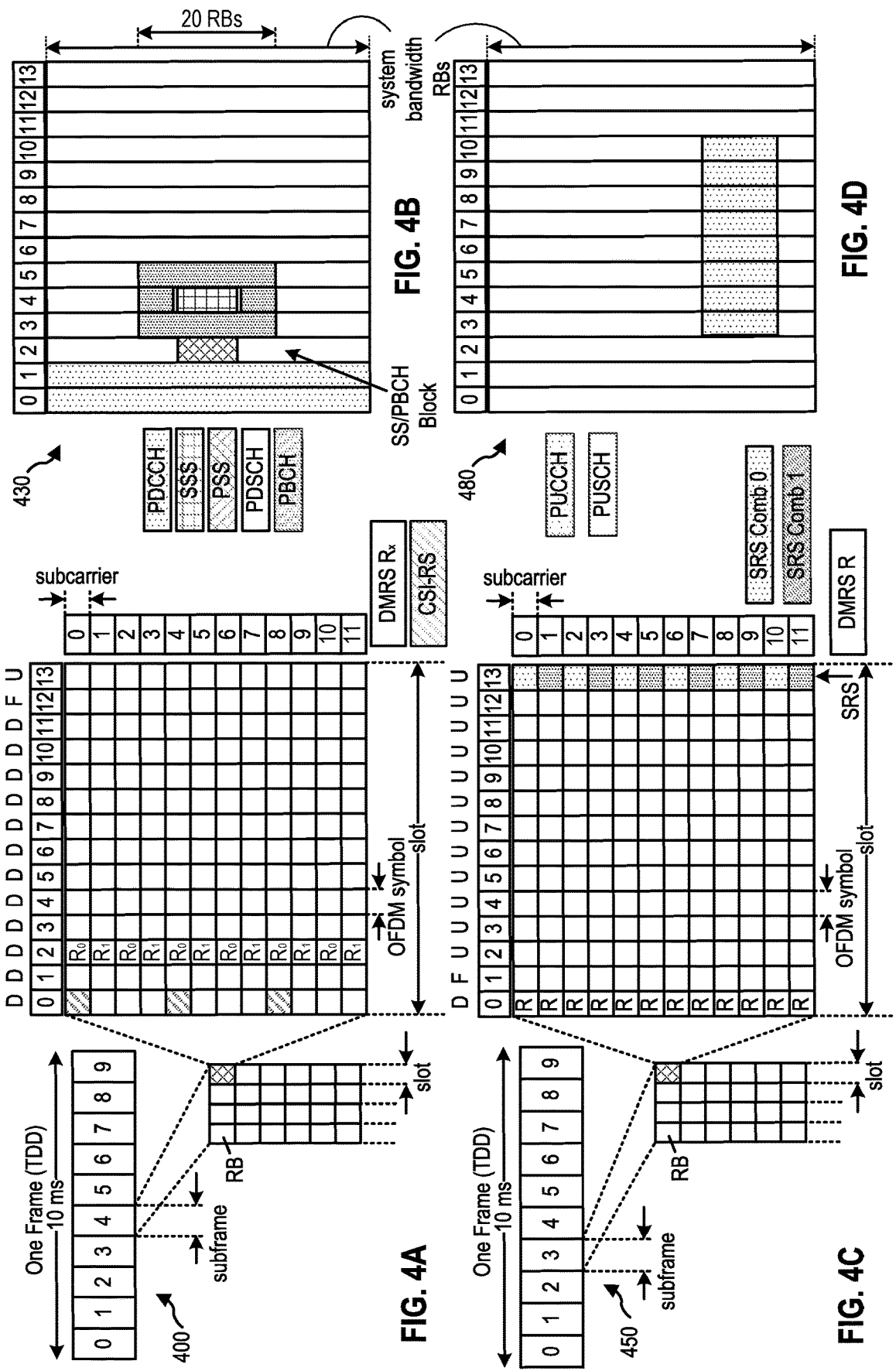
FIGS. 4A, 4B, 4C, and 4D depict aspects of data structures for a wireless communications network, such as wireless communications network of FIG. 1, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology index, which may be selected from values 0 to 5. Accordingly, the numerology $\mu=0$ has a subcarrier spacing of 15 kHz and the numerology $\mu=5$ has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSS) for a UE (e.g., UE 120). The RSs may include demodulation RSs (DMRSs) and/or channel state information reference signals (CSI-RSs) for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., UE 120) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The PBCH, which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit sounding reference signals (SRSs). The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledge/negative acknowledge (ACK/NACK) feedback. The PUSCH carries data, and may additionally be used to carry a buffer status report (BSR), a power headroom report (PHR), and/or UCI.

Figure 5:
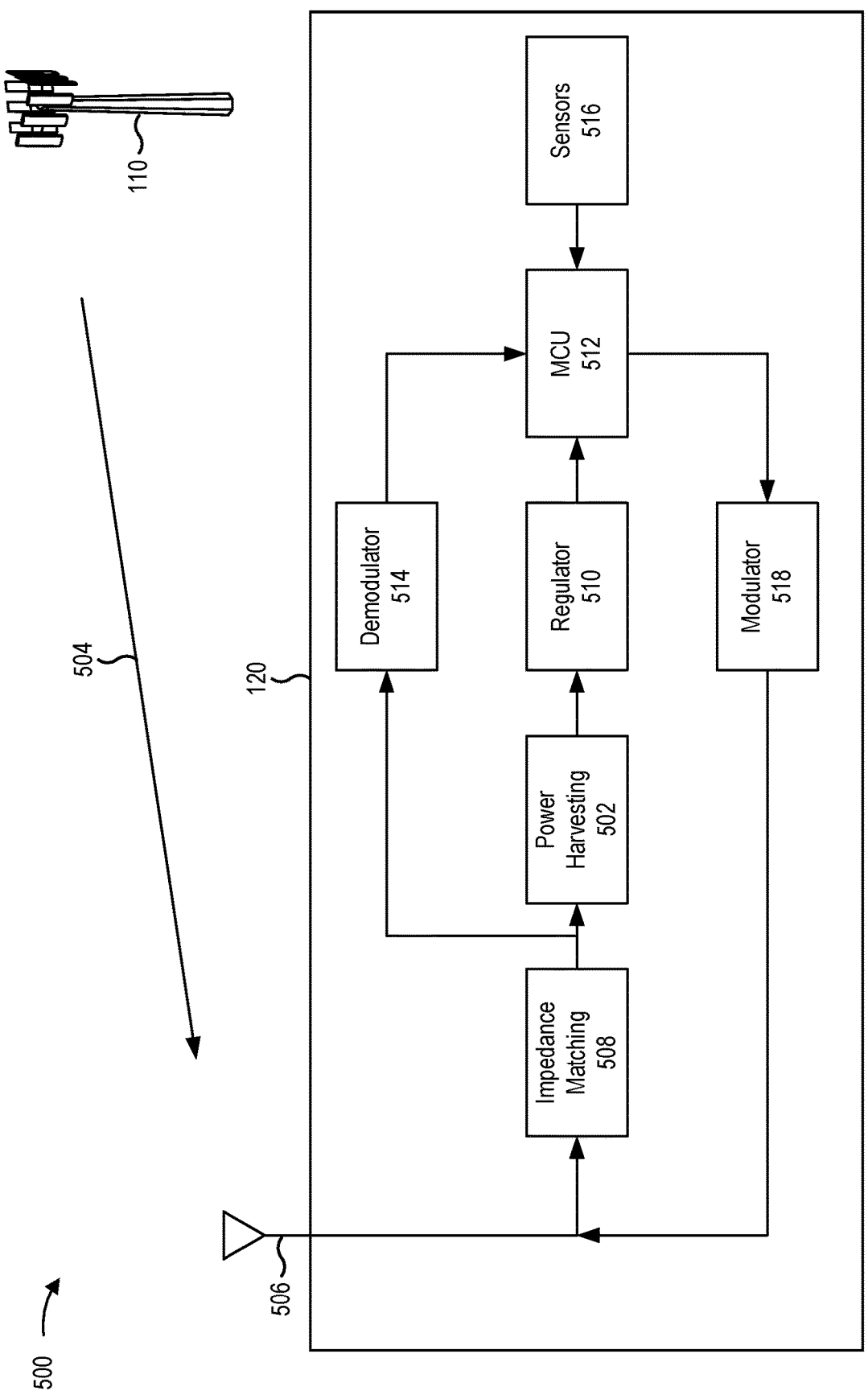
FIG. 5 is a diagram illustrating an example of a passive UE, in accordance with the present disclosure.

FIG. 5 is a diagram illustrating an example 500 of a passive UE, in accordance with the present disclosure.

Some wireless communication devices may be considered IoT devices, such as ambient IoT devices (sometimes referred to as ultra-light IoT devices), or similar IoT devices. IoT technology may include passive IoT (e.g., NR passive IoT for 5G Advanced), semi-passive IoT, ultra-light IoT, or ambient IoT, among other examples. To illustrate a difference between an active device and a passive device, an active device and/or active component (e.g., a semiconductor device, a voltage source, and/or an operational amplifier) may add and/or transfer energy into a circuit. A passive device and/or passive component (e.g., a resistor, a capacitor, and/or a diode) may store and/or consume energy. Accordingly, in some aspects, "passive device" may denote a device without an external energy source and/or a device configured to use environmental energy for an energy supply. A "semi-passive" device may be a type of passive device that includes a battery that is charged by the device based at least in part on (converted) environmental energy as described below.

In passive IoT, a terminal (e.g., a radio frequency identification (RFID) device, a tag, or a similar device) may not include a battery, and the terminal may accumulate energy from radio signaling. Additionally, the terminal may accumulate solar energy to supplement accumulated energy from radio signaling. In passive IoT, a communication distance may be up to 30 meters (or more) to facilitate feasible network coverage over a large area (e.g., 5000 square meters), such as in a warehouse. Moreover, the power consumption of a passive IoT terminal (e.g., a UE) may be less than 0.1 milliwatts (mW) to support operation without a battery, and the terminal may be relatively inexpensive to facilitate cost-sensitive uses. A positioning accuracy of a passive IoT terminal may be approximately 3-5 meters in the horizontal and the vertical directions.

Passive IoT may be useful in connection with industrial sensors, for which battery replacement may be prohibitively difficult or undesirable (e.g., for safety monitoring or fault detection in smart factories, infrastructures, or environments). Additionally, features of passive IoT devices, such as low cost, small size, maintenance-free, durable, long lifespan, or the like, may facilitate smart logistics/warehousing (e.g., in connection with automated asset management by replacing RFID tags). Furthermore, passive IoT may be useful in connection with smart home networks for household item management, wearable devices (e.g., wearable devices for medical monitoring for which patients do not need to replace batteries), and/or environment monitoring. To achieve further cost reduction and zero-power communication, 5G+/6G wireless networks may utilize a type of passive IoT device referred to as an "ambient backscatter device" or a "backscatter device."

A backscatter device, such as an RFID tag, a sensor, or the like, may employ a simplified hardware design (e.g., including a power splitter, an energy harvester, and a microcontroller) that does not include a battery, such that the backscatter device relies on energy harvesting for power. In some aspects, a backscatter device may transmit information by reflecting a radio wave as described below with regard to FIGS. 6A, 6B, and 7. Alternatively or additionally, the backscatter device may include a battery that stores power gathered by energy harvesting and/or may include modulation circuitry for generating a transmission based at least in part on harvested energy that is stored in the battery. Accordingly, some backscatter devices may transmit information based at least in part on reflecting a radio wave and/or based at least in part on modulation circuitry. To illustrate, a backscatter device may initially transmit information via backscatter and subsequently transmit information via modulation circuitry and harvested energy stored in the battery.

The example 500 includes a network entity and/or network node (e.g., BS 110) and a UE 120 that may be implemented at least in part as a passive UE. The UE 120 includes a power harvesting component 502 that includes an electronic circuit to convert energy from an input signal 504 (e.g., a downlink signal from the network entity) received via an antenna 506 to an energy source for one or more components included in the UE 120. For example, the power harvesting component 502 may include a diode that is electrically coupled to a capacitor. The power harvesting component 502 may receive the input signal 504 based at least in part on an antenna 506 and/or an impedance matching circuit 508. As shown by the example 500, the power harvesting component 502 may electrically couple to a regulator component 510 that outputs a fixed voltage for powering a microcontroller unit (MCU) 512. As one example, the regulator component 510 may convert an input alternating current (AC) signal to a direct current (DC) signal. The microcontroller unit 512 may process input from a demodulator component 514 (e.g., that demodulates the input signal 504) and/or one or more sensors 516. In some aspects, the microcontroller unit 512 may generate an output that is input to a modulator component 518 and transmitted by the UE 120 to the network entity (e.g., BS 110). While the example 500 shows the UE 120 as including a demodulator component 514 and a modulator component 518, other examples of a passive UE may not include the demodulator component 514 and/or the modulator component 518. For example, a passive UE implemented as a passive IoT device and/or a passive RFID may include a diode, a capacitor, a resistor, and a switch to generate a backscatter signal (e.g., a reflected signal) that includes modulated information as described below.

In some aspects, how a wireless communication system (e.g., a 5G wireless communication system) communicates with a passive UE may result in inefficient power harvesting by the passive UE. To illustrate, a power associated with an output signal by a power harvester component included in the passive UE may be based at least in part on diode behavior that is relative to characteristics associated with an input signal. For example, for a first range of input voltages and/or signals, the diode may output a first output signal with higher power relative to a second output signal that is associated with a second range of input voltages and/or signals. Accordingly, an output signal (and/or a power level associated with the output signal) may vary based at least in part on a diode and the diode's operating characteristics. As another example, power harvesting by an RFID passive UE and/or an IoT passive UE may be configured to work when operating 10 meters or less from a network entity based at least in part on a link budget. That is, the device may successfully capture power from an environment based at least in part on operating within 10 meters of the transmitting device, and may be inoperative outside that operating range. Alternatively or additionally, the power harvesting circuitry may be configured to operate at an input power of −13 decibel milliwatts (dBm) such that a lower input power (e.g., −20 dBm) may be insufficient to operate the power harvesting circuitry. As yet another example, the higher frequencies associated with some wireless communication systems (e.g., above 6 GHz) may be more susceptible to multi-path fading that results in decreased input signal power to the power harvester and/or a reduced operating range (e.g., a reduced operating distance between the UE and the network entity). Accordingly, various factors may render a passive UE inoperable.

Some techniques and apparatuses described herein provide a precoding vector that is based on singular value decomposition characterization of a communication channel. In some aspects, a precoding vector may indicate and/or include weights that are applied to the signals of a MIMO transmission (e.g., respective amplitude weights and/or respective phase shifts for each signal). The weights may be based at least in part on channel state information associated with a communication channel and/or may be configured to modify the signals of the MIMO transmission in a manner that improves a signal quality of the MIMO transmission (e.g., increased transmit power level, increased received power level, reduced interference, and/or reduced fading). A network entity may obtain a singular value decomposition (SVD) precoding vector that is based at least in part on backscatter. "SVD precoding vector" may denote a precoding vector that is based at least in part on characterizing a communication channel using SVD as described below with regard to FIGS. 6A and 6B. In some aspects, the backscatter associated with the SVD precoding vector may be based at least in part on a reference signal transmitted by the network entity. In at least one example, the network entity may transmit the reference signal, receive the backscatter, and generate the SVD precoding vector. In another example, the network entity is a first network entity that transmits the reference signal, and a second network entity may generate the SVD precoding vector based at least in part on the backscatter. That is, the second network entity may receive the backscatter associated with the reference signal, generate the SVD precoding vector, and transmit an indication of the SVD precoding vector to the first network entity (e.g., via a backhaul link). The network entity may apply the SVD precoding vector to an output signal, and transmit the output signal based at least in part on a set of antennas. To illustrate, the network entity may include the set of antennas, and transmit the output signal based at least in part on applying a respective portion of the SVD precoding vector to a respective signal being transmitted by a respective antenna within the set of antennas.

Based at least in part on an SVD representation of a communication channel, a device, such as a network entity and/or a receiving reader device as described with regard to FIGS. 6A and 6B, may generate a channel estimation based at least in part on backscatter associated with a reference signal. The device may use the channel estimation to generate an SVD precoding vector that, when applied to a MIMO transmission at a transmitting device, improves a received signal quality at a passive UE. For example, the SVD precoding vector may generate a MIMO transmission that results in a higher received power level at a passive UE relative to a second MIMO transmission that is not based at least in part on the SVD precoding vector. Accordingly, the improved received signal quality may enable a passive UE to harvest power and/or energy in wireless communications systems that operate at higher frequencies (e.g., that may be more susceptible to multi-path fading) and/or increase an operating range of the passive UE from the network entity.

As indicated above, FIG. 5 is provided as an example. Other examples may differ from what is described with regard to FIG. 5.

FIGS. 6A and 6B are diagrams illustrating a first example 600 and a second example 602, respectively, of a multi-antenna reader channel model that is based at least in part on backscatter, in accordance with the present disclosure.

A backscatter device may communicate with a reader device based at least in part on modulating a reflecting radio signal from an RF source. In some examples, such as the first example 600 of FIG. 6A, the RF source and the reader device may be a same device and/or may be co-located. A co-located RF source and reader device may also be referred to as a monostatic implementation. In other examples, such as the second example 602 of FIG. 6B, the RF source and the reader may reside at different devices. An RF source implemented in a separate device than a reader device may also be referred to as a bistatic implementation.

The first example 600 of FIG. 6A includes a monostatic reader device 604 and a passive UE 606. In some aspects, the monostatic reader device 604 may be implemented by, included in, and/or be implemented as a network entity (e.g., BS 110). Alternatively or additionally, the passive UE 606 may include a power harvesting circuit, such as the power harvesting component 502 described with regard to FIG. 5, that is configured to capture power from an environment (e.g., an RF signal).

As shown by FIG. 6A, the monostatic reader device 604 in the first example 600 includes M antennas 608, where M is an integer. In some aspects, the monostatic reader device 604 transmits a MIMO output signal 610 (shown with solid lines) based at least in part on the M antennas 608. For example, the monostatic reader device 604 may transmit, as the MIMO output signal, multiple signals simultaneously and/or contemporaneously using the M antennas 608. That is, the monostatic reader device 604 may transmit M signals (e.g., M signals that carry the same information) in a same transmit channel simultaneously by transmitting each signal of the M signals on a respective antenna of the M antennas 608. In some aspects, and as described below, the monostatic reader device 604 may transmit, as the MIMO output signal 610, a reference signal. Examples of a reference signal may include a carrier wave (CW), a narrowband signal (e.g., a single tone), a wideband signal (e.g., two or more tones), and/or a channel state information reference signal (CSI-RS). The M signals may propagate toward the passive UE 606 and reflect off the passive UE 606 as backscatter 612 (shown with dashed lines).

The second example 602 of FIG. 6B includes a transmit reader device 614, a receive reader device 616, and the passive UE 606. In some aspects, the transmit reader device 614 may be implemented by, included in, and/or be implemented as a first network entity (e.g., a BS 110). Alternatively or additionally, the receive reader device 616 may be implemented by, included in, and/or be implemented as a second network entity (e.g., another BS 110). Collectively, the transmit reader device 614 and the receive reader device 616 may be referred to as a bistatic reader device. That is, a bistatic reader device include both the transmit reader device 614 and the receive reader device 616.

As shown by FIG. 6B, the transmit reader device 614 in the second example 602 includes M antennas 618, and the receive reader device 616 includes N antennas 620, where N is an integer that may have a same value or a different value than M. The transmit reader device 614 may transmit a MIMO output signal 622 (shown with solid lines) based at least in part on the M antennas 618, such as by transmitting a respective signal on each antenna of the M antennas 618. The M signals may propagate toward the passive UE 606 (e.g., as the MIMO output signal 622) and reflect off the passive UE 606 as backscatter 624 (shown with dashed lines). As shown by FIG. 6B, at least some of the backscatter 624 may propagate toward the receive reader device 616. The receive reader device 616 may receive the backscatter 624 based at least in part on the N antennas 620, such as by receiving at least a portion of the backscatter 624 on a respective antenna of the N antennas 620.

In some aspects, the monostatic reader device 604 and/or the transmit reader device 614 may apply precoding to the MIMO output signal 610 and/or the MIMO output signal 622 to improve an efficiency of the MIMO output signal 610 and/or the MIMO output signal 622 (e.g., an increased transmit power level, an increased receive power level, an increased spectral efficiency, and/or reduced interference). Improving the efficiency of the MIMO output signals may enable the passive UE 606 to harvest energy at an increased distance from a transmitting device and, subsequently, power circuitry within the passive UE 606 to enable operation of the passive UE 606.

"Precoding" may denote preprocessing one or more transmit signals based at least in part on improving a performance of the transmitted signal. To illustrate, a transmitting reader device (e.g., the monostatic reader device 604 and/or the transmit reader device 614) may apply precoding to one or more signals (e.g., the M signals) based at least in part on digital signal processing (DSP) in which the signal(s) may be represented as digital samples and precoding values may be applied to the digital samples based at least in part on mathematical operations. As described above, a precoding vector may be based at least in part on channel state information associated with a communication channel, such as a first communication channel between the monostatic reader device 604 and the passive UE 606, a second communication channel between the transmit reader device 614 and the passive UE 606, and/or a third communication channel between the passive UE 606 and the receive reader device 616. Accordingly, and as described below with regard to FIG. 7, the monostatic reader device 604 and/or the transmit reader device 614 may transmit a reference signal (e.g., the MIMO output signal 610 and/or the MIMO output signal 622) toward the passive UE 606. Alternatively or additionally, the monostatic reader device 604 and/or the receive reader device 616 may generate one or more channel estimations based at least in part on backscatter associated with the reference signal (e.g., the backscatter 612 and/or the backscatter 624). Based at least in part on the channel estimation(s), the monostatic reader device 604 and/or the receive reader device 616 may generate an SVD precoding vector that may be applied to additional MIMO output signals to improve an efficiency of the signals and enable the passive UE 606 to harvest energy from the additional MIMO output signals at an increased operating distance from a transmitting reader device (e.g., the monostatic reader device 604 and/or the transmit reader device 614).

To further illustrate, a transmitting reader device may include M transmit antennas, and a receiving reader device (e.g., the monostatic reader device 604 and/or the transmit reader device 614) may include N receive antennas. A forward link channel between a transmit antenna of the transmitting reader device and the passive UE may be expressed as:

$$f_m, m=0,1,\ldots,M-1 \quad (1),$$

a backscatter link channel from the passive UE to a receive antenna of the receiving reader device may be expressed as:

$$b_n, n=0,1,\ldots,N-1 \quad (2),$$

and:

$$c \quad (3)$$

may represent a complex reflection coefficient associated with the passive UE. In a monostatic implementation, M=N and $f_m=b_n$ based on channel reciprocity. In a bistatic implementation, M and N may have a same value or different values, and $f_m$ and $b_n$ may have different channel characteristics based at least in part on the different propagation paths.

Based at least in part on the expressions above, a communication channel H at a receiving reader device may be expressed as:

$$H=cb \cdot f+E \quad (4) \text{ where:}$$

$$b=[b_0,\ldots,b_{N-1}]^T \in C^{N\times 1} \quad (5)$$

$$f=[f_0,\ldots,f_{M-1}] \in C^{1\times M} \quad (6)$$

and $$E \in C^{N\times M} \quad (7)$$

is the error matrix due to noise. As described above, c is a complex number that represents a reflection coefficient associated with the passive UE.

The transmitting reader device may transmit a reference signal, such as a CSI-RS, a CW, a narrowband reference signal (e.g., a single tone), and/or a wideband reference signal (e.g., two or more tones). To illustrate, the transmitting reader device may transmit the reference signal based at least in part on using a single resource element (RE) for an OFDM waveform to transmit a CW. Alternatively or additionally, the transmitting reader device may transmit, as the reference signal, a comb waveform (e.g., multiple tones) based at least in part on using multiple REs for an OFDM waveform. The receiving reader device may calculate and/or obtain H based at least in part on receiving backscatter associated with the reference signal using each reader receiver antenna. Alternatively or additionally, the receiving reader device may calculate an SVD precoding vector based at least in part on using SVD to characterize H. As described above, an SVD precoding vector may be a precoding vector that is based at least in part on characterizing a communication channel (e.g., H) using SVD.

In the equation (4), H is a rank one matrix. Accordingly, an SVD representation of H can be expressed as:

$$H=U\Lambda V^H \quad (8)$$

where U and V are unitary matrices of the left and right eigenvectors, respectively, of H, and $\Lambda$ is a diagonal matrix with diagonal entries of the singular values of H. Accordingly, a leading left eigenvector (e.g., a first column of U) can be expressed as:

$$u_1 \quad (9)$$

and a leading right eigenvector (e.g., a first column of V) can be expressed as:

$$v_1 \quad (10)$$

Using the leading left eigenvector, an estimation of the backscatter link channel can be expressed as:

$$\hat{b}=\alpha \cdot u_1 \quad (11)$$

and, using the leading right eigenvector, an estimation of the forward link channel can be expressed as:

$$\hat{f}=\beta \cdot v_1^H \quad (12)$$

where $\alpha$ and $\beta$ are complex scalars. Accordingly, equation (11) may be used to identify a first SVD precoding vector associated with improving an efficiency of backscatter (e.g., backscatter 612 and/or backscatter 624), and equation (12) may be used to identify a second SVD precoding vector associated with improving an efficiency of a transmitted MIMO signal (e.g., MIMO output signal 610 and/or MIMO output signal 622). That is, based on equation (12), a receiving reader device may calculate an SVD precoding vector based at least in part on (a) generating a channel estimation using the backscatter associated with a reference signal, (b) calculating the leading right eigenvector (e.g., $v_1$) using the channel estimation and equation (12), and (c) calculating an SVD precoding vector associated with the forward channel to improve and/or optimize received energy at the passive UE 606. For example, an SVD precoding vector may be derived based at least in part on deriving a matched filter using the backscatter and knowledge about the reference signal (e.g., reference signal type, reference signal carrier frequency, and/or reference signal bandwidth). To illustrate, a receiving receiver device may compute a channel estimation matrix based at least in part on the backscatter, and derive a matched filter that is associated with a forward link communication channel, and subsequently calculate the SVD precoding vector, based at least in part on receiving the backscatter and knowing the reference signal used to generate the backscatter and/or the channel estimation matrix. Accordingly, an SVD precoding vector that is based at least in part on $v_1$ may be applied to signals associated with a MIMO transmission to improve a signal quality associated with power harvesting at a passive UE. A phase rotation and/or amplitude change associated with β may not affect a precoder and may be disregarded in the generation of the SVD precoding vector. To illustrate, applying the SVD precoding vector to the signals transmitted by the set of antennas for a MISO transmission (e.g., an energy signal transmitted to the UE 606) may improve and/or optimize the received energy at the UE 606 as described above. The received signal at the UE 606 may be a sum of the signals from all the antennas (e.g., the MISO transmission). Accordingly, a constant amplitude and phase applied across all the antennas (e.g., associated with will the constant β) will not change the received signal power at the UE 606.

In some aspects, a transmitting reader device may have multiple transmit antennas, and a receiving reading device may have a single receive antenna (e.g., N=1). In such an example, the communication channel H at the receiving reader device may be expressed as:

$$H = cbf + E \quad (13)$$

Based at least in part on equation (13), the forward channel coefficients, f, may be calculated directly from the channel estimate of the communication channel H at the receiving reader device. That is, the backscatter link channel in equation (13) is a scalar value, and the channel estimation may be used directory as the SVD precoding vector.

Based at least in part on an SVD representation of a communication channel, a receiving reader device (e.g., a BS 110) may generate a channel estimation using backscatter associated with a reference signal. The receiving reader device may use the channel estimation to generate an SVD precoding vector that, when applied to a MIMO transmission at a transmitting reader device (e.g., the BS 110 or another BS 110), improves a received signal quality (e.g., an increased receive power level and/or reduced interference) at a passive UE. Accordingly, the improved received signal quality may enable a passive UE to harvest power and/or energy in wireless communications systems that operate at higher frequencies (e.g., that may be more susceptible to multi-path fading) and/or increase an operating range of the passive UE from the network entity.

As indicated above, FIGS. 6A and 6B are provided as examples. Other examples may differ from what is described with regard to FIGS. 6A and 6B.

Figure 7:
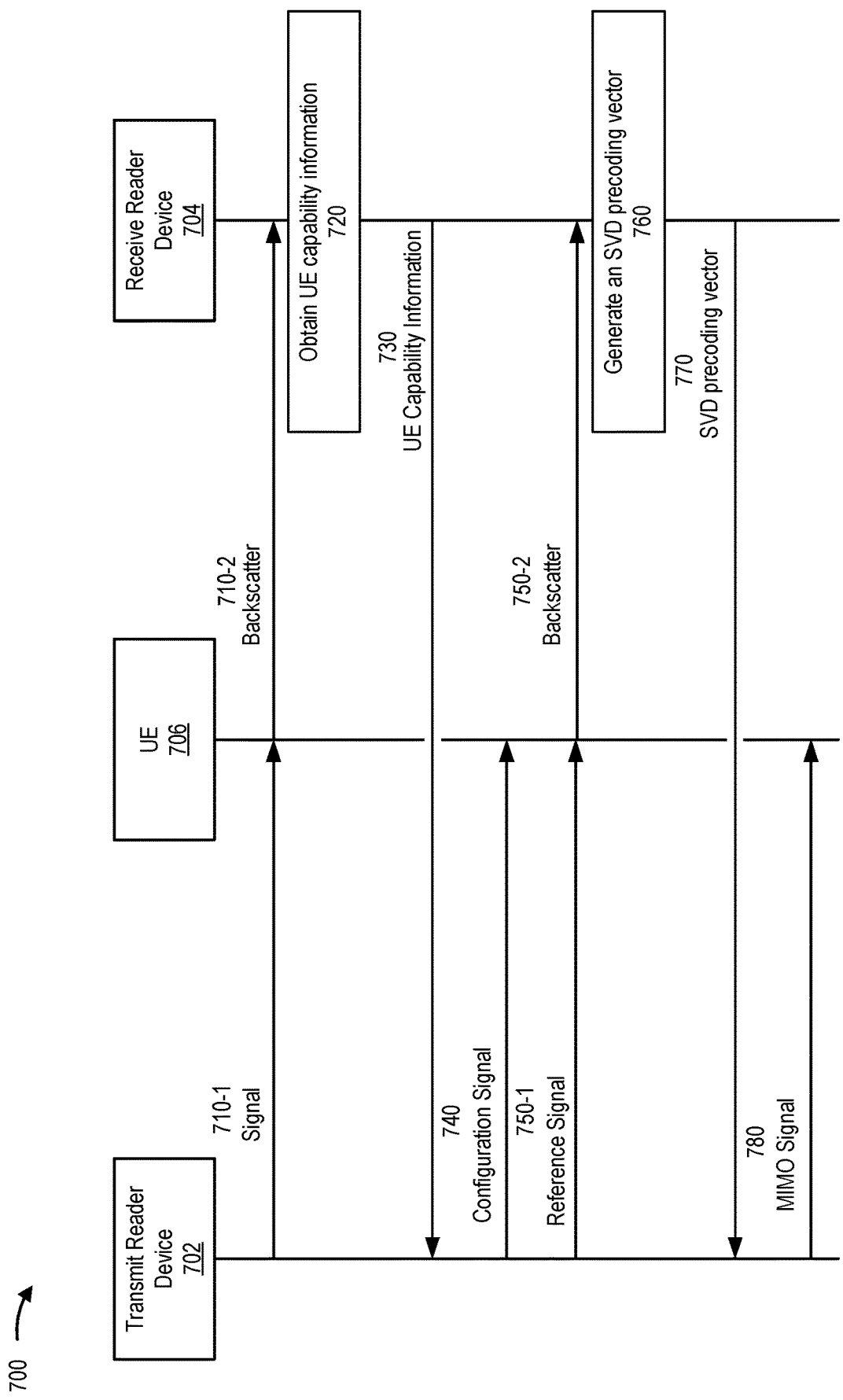
FIG. 7 is a diagram illustrating an example of a wireless communication process between a transmit reader device, a receive reader device, and a UE, in accordance with the present disclosure.

FIG. 7 is a diagram illustrating an example 700 of a wireless communication process between a transmit reader device 702 (e.g., a BS 110), a receive reader device 704 (e.g., the BS 110 or another BS 110), and a UE 706 (e.g., a UE 120), in accordance with the present disclosure. In some aspects, the transmit reader device 702 and the receive reader device 704 are co-located in a single device (e.g., a single network entity, such as a single BS 110 and/or a monostatic device as described with regard to FIG. 6A). In other aspects, the transmit reader device 702 and the receive reader device 704 are implemented in separate devices (e.g., a first BS 110 and a second BS 110 and/or a bistatic reader as described with regard to FIG. 6B). The UE may be implemented as a passive UE, examples of which are provided above.

As shown by reference number 710-1, a transmit reader device 702 may transmit a signal toward a UE 706. As shown by reference number 710-2, the UE 706 may generate, and the receive reader device may receive, backscatter based at least in part on the signal. As one example, the transmit reader device 702 may initiate a communication session (sometimes referred to as a query-response communication) with a query, which may be a modulating envelope of a CW. The UE 706 may respond by backscattering the CW. For clarity, the example 700 shows a single transmission by the transmit reader device 702, and a single backscatter by the UE 706, but the communication session may include multiple rounds, such as for purposes of contention resolution when multiple backscatter devices respond to a query. The UE 706 may have reflection-on periods and reflection-off periods that follow a pattern that is based at least in part on the transmission of information bits by the UE 706. The receive reader device 702 may detect the reflection pattern of the UE 706 and obtain a backscatter communication that includes information. To illustrate, the UE 706 may use an information modulation scheme, such as amplitude shift keying (ASK) modulation or on-off keying (OOK) modulation. For ASK or OOK modulation, the UE 706 may switch on reflection when transmitting an information bit "1" and switch off reflection when transmitting an information bit "0."

As shown by reference number 720, the receive reader device 704 may obtain UE capability information based at least in part on the backscatter. To illustrate, the backscatter generated by the UE 706 as shown by reference number 710-2 may include a backscatter communication that indicates UE capability information. For example, the UE 706 may use ASK modulation and/or OOK modulation to indicate one or more supported frequency shifts supported by the UE 706 (e.g., frequency shifts associated with the backscatter).

As shown by reference number 730, the receive reader device 704 may transmit, and the transmit reader device 702 may receive, the UE capability information. As one example, in a bistatic reader implementation, the receive reader device 704 may transmit the UE capability information based at least in part on using a backhaul link. As another example, in a monostatic reader implementation, the receive reader device 704 may store the UE capability information in memory accessible to the transmit reader device 702 and/or use application communication techniques (e.g., as a function parameter, as an application message, and/or as an object property). The receive reader device 704 may indicate an entirety of the UE capability information, or portions of the UE capability information, to the transmit reader device 702. In some aspects, the receive reader device 704 may select a supported frequency shift from the multiple supported frequency shifts, and indicate the selected frequency shift to the transmit reader device 704.

As shown by reference number 740, the transmit reader device 702 may transmit, and the UE 706 may receive, a configuration signal. For instance, the transmit reader device 702 may indicate, via the configuration signal, to use the selected frequency shift. That is, the transmit reader device 702 may configure the UE 706 to add a frequency shift to backscatter. In some aspects, the transmit reader device 702 indicates a frequency shift selected by the receive reader device 704. In other aspects, the transmit reader device 702 selects a frequency shift from the supported frequency shift(s) indicated by the UE capability information, and indicates the frequency shift selected by the transmit reader device 702 in the configuration signal and/or to the receive reader device 704 (e.g., via the backhaul, via shared memory, and/or via application communication techniques).

The transmit reader device 702 and the receive reader device 704 may repeat any combination of actions as described with regard to reference number 710-1, reference number 710-2, reference number 720, reference number 730, and/or reference number 740. In some aspects, additional and/or separate UEs may perform the actions as described with regard to reference number 710-2. For example, multiple different UEs (e.g., multiple passive UEs) may generate backscatter based at least in part on the signal transmitted as described with regard to reference number 710-1. Accordingly, the receive reader device 704 may obtain respective UE capability information associated with multiple different UEs. The receive reader device 704 may transmit the respective UE capability information to the transmit reader device 702 and/or respective frequency shifts selected by the receive reader device 704 for each of the multiple different UEs. The transmit reader device 702 may transmit a configuration signal (and/or a respective configuration signal) that indicates, to each of the multiple different UEs, the respective frequency shift to apply to backscatter. In some aspects, the transmit reader device 702 may select each of the respective frequency shifts. By configuring one or more of the multiple different UEs with a respective frequency shift, a reader device (e.g., a bistatic reader device and/or a monostatic reader device) may configure backscatter generated by a first UE to occupy a different frequency band than backscatter generated by a second UE, and mitigate interference generated by the different UEs.

As shown by reference number 750-1, a transmit reader device 702 may transmit a reference signal. As shown by reference number 750-2, the UE 706 may generate backscatter based at least in part on the reference signal. In some aspects, the transmit reader device 702 may include a set of antennas, and the transmit reader device 702 may transmit the reference signal based at least in part on the set of antennas. For example, the transmit reader device may transmit the reference signal as a MIMO transmission in which a respective signal is transmitted on a respective antenna in the set of antennas. The transmit reader device 702 may transmit, as the reference signal, a CW, a narrowband signal (e.g., a single tone), a wideband transmission (e.g., two or more tones), and/or a CSI-RS. The narrowband reference signal transmission and/or the wideband reference signal transmission may be based at least in part on an OFDM waveform as described above.

As shown by reference number 760, the receive reader device 704 may generate an SVD precoding vector (e.g., based at least in part on the backscatter). The receive reader device 704 may generate the SVD precoding vector based at least in part on computing a channel estimation matrix using the backscatter associated with the reference signal and/or knowledge of the reference signal (e.g., reference signal type, reference signal carrier frequency, and/or reference signal bandwidth). Alternatively or additionally, the receive reader device may compute a right eigenvector that is associated with an SVD representation of the communication channel (e.g., as in equation 12).

In some aspects, the SVD precoder vector may be based at least in part on a matched filter. For example, the receive reader device 704 may derive the matched filter based at least in part on the channel estimation matrix and/or the reference signal. In some aspects, the SVD precoding vector may be based at least in part on a uniform power matched filter that applies, for each antenna in a set of antennas and prior to transmission, a commensurate amplitude level (e.g., an amplitude level that is within a range of amplitude levels and/or within a threshold of an amplitude level) to a respective portion of the output signal transmitted by the antenna in the set of antennas. That is, the uniform power matched filter may apply and/or be configured to a same and/or commensurate amplitude level to each respective signal associated with each respective antenna in the set of antennas. Alternatively or additionally, the SVD precoding vector may be based at least in part on a matched filter that applies and/or is configured to apply a respective amplitude level (e.g., commensurate or different) and a respective phase shift to a respective signal transmitted by a respective antenna in the set of antennas.

As shown by reference number 770, the receive reader device 704 may transmit, and the transmit reader device 702 may receive, an indication of the SVD precoding vector. In some examples, such as in a bistatic implementation, the receive reader device 704 may transmit the indication of the SVD precoding vector via a backhaul link with the transmit reader device 702. In other examples, such as a monastic implementation, the receive reader device 704 may transmit the indication of the SVD precoding vector by storing the SVD precoding vector in memory accessible by the transmit reader device 702 and/or via application communication techniques.

As shown by reference number 780, the transmit reader device 702 may transmit, and the UE 706 may receive, a MIMO signal that is based at least in part on the SVD precoding vector. To illustrate, the transmit reader device 702 may apply, for each antenna in the set of antennas and based at least in part on DSP techniques, a respective phase shift to a respective signal that is a respective portion of an output signal (e.g., the MIMO output signal 610 and/or the MIMO output signal 622) transmitted by the antenna in the set of antennas. Alternatively or additionally, the transmit reader device 702 may apply, for each antenna in the set of antennas, a respective amplitude level to the respective signal and/or the respective portion of the output signal transmitted by the antenna. Alternatively or additionally, the transmit reader device may apply the SVD precoding vector to an energy signal (e.g., a MISO transmission).

Based at least in part on an SVD representation of a communication channel, a receiving reader device (e.g., a network entity, such as the BS 110) may generate a channel estimation using backscatter associated with a reference signal. The receiving reader device may use the channel estimation to generate an SVD precoding vector that, when applied to a MIMO transmission and/or MISO transmission at a transmitting reader device (e.g., the network entity or another network entity), improves a received signal quality (e.g., an increased receive power level and/or reduced interference) at a passive UE. Accordingly, the improved received signal quality may enable a passive UE to harvest power and/or energy in wireless communications systems that operate at higher frequencies (e.g., that may be more susceptible to multi-path fading) and/or increase an operating range of the passive UE from the network entity.

As indicated above, FIG. 7 is provided as an example. Other examples may differ from what is described with regard to FIG. 7.

Figure 8:
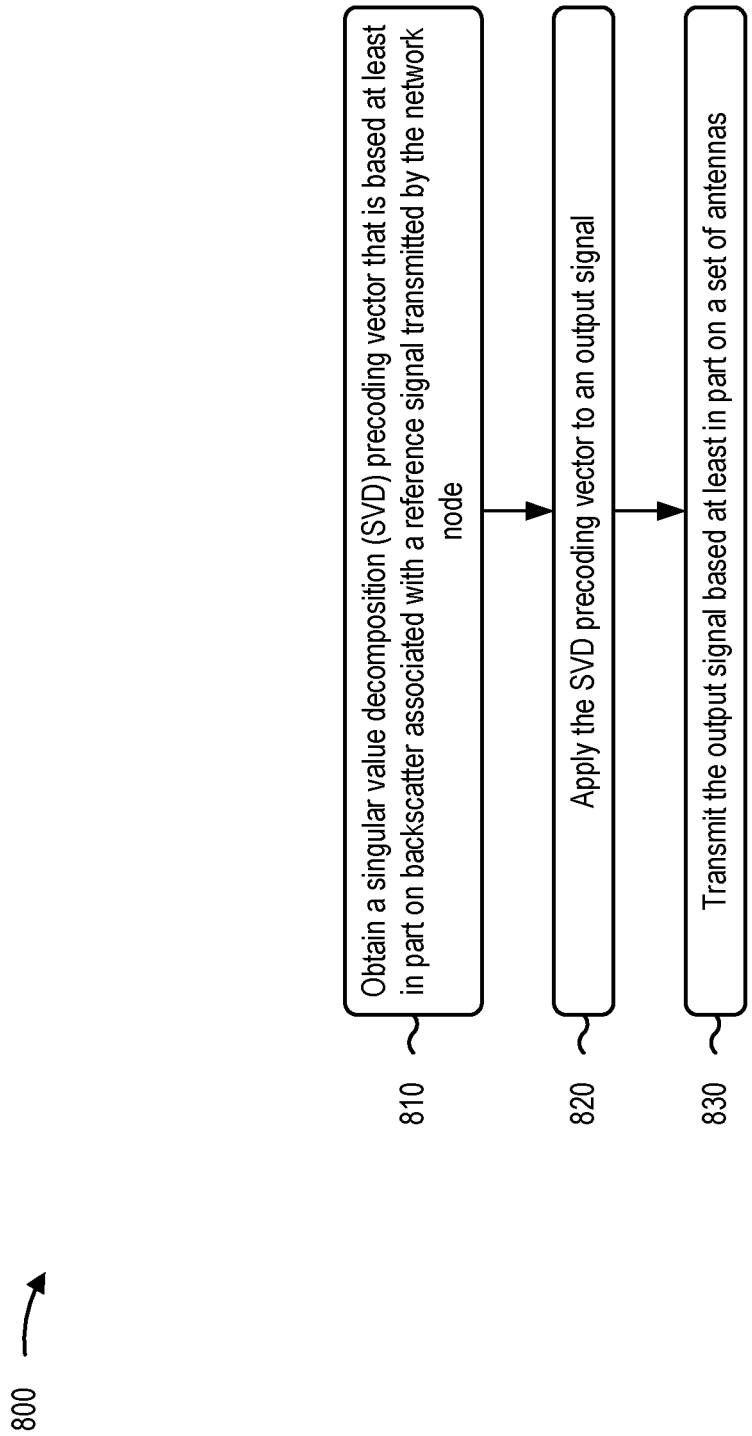
FIG. 8 shows a method for wireless communications by a network entity, in accordance with the present disclosure.

FIG. 8 shows a method 800 for wireless communications by a network entity, such as BS 110.

Method 800 begins at 810 with obtaining an SVD precoding vector that is based at least in part on backscatter associated with a reference signal transmitted by the network entity.

Method 800 then proceeds to 820 with applying the SVD precoding vector to an output signal.

Method 800 then proceeds to 830 with transmitting the output signal based at least in part on a set of antennas.

In a first aspect, the SVD precoder vector is based at least in part on a matched filter.

In a second aspect, alone or in combination with the first aspect, the matched filter is based at least in part on the backscatter.

In a third aspect, alone or in combination with one or more of the first and second aspects, the matched filter comprises a uniform power matched filter that applies, for each antenna in the set of antennas, a commensurate amplitude level to a respective portion of the output signal transmitted by the antenna in the set of antennas.

In a fourth aspect, alone or in combination with one or more of the first through third aspects, the matched filter may apply, for each antenna in the set of antennas, a respective phase shift to the respective portion of the output signal transmitted by the antenna in the set of antennas.

In a fifth aspect, alone or in combination with one or more of the first through fourth aspects, applying the SVD precoder vector includes applying, for each antenna in the set of antennas, a respective phase shift and a respective amplitude level to a respective portion of the output signal transmitted by the antenna in the set of antennas.

In a sixth aspect, alone or in combination with one or more of the first through fifth aspects, method 800 includes transmitting the reference signal based at least in part on the set of antennas.

In a seventh aspect, alone or in combination with one or more of the first through sixth aspects, the reference signal is a continuous wave.

In an eighth aspect, alone or in combination with one or more of the first through seventh aspects, the reference signal is a wideband transmission.

In a ninth aspect, alone or in combination with one or more of the first through eighth aspects, the wideband transmission includes an OFDM waveform.

In a tenth aspect, alone or in combination with one or more of the first through ninth aspects, the wideband transmission includes two or more tones.

In an eleventh aspect, alone or in combination with one or more of the first through tenth aspects, method 800 includes receiving the backscatter based at least in part on transmitting the reference signal, and obtaining the SVD precoding vector includes generating the SVD precoding vector based at least in part on the backscatter.

In a twelfth aspect, alone or in combination with one or more of the first through eleventh aspects, method 800 includes computing a channel estimation matrix that is associated with a communication channel based at least in part on the backscatter, wherein generating the SVD precoding vector is based at least in part on the channel estimation matrix.

In a thirteenth aspect, alone or in combination with one or more of the first through twelfth aspects, generating the SVD precoding vector includes computing, based at least in part on the channel estimation matrix, a right eigenvector of an SVD representation of the communication channel.

In a fourteenth aspect, alone or in combination with one or more of the first through thirteenth aspects, obtaining the SVD precoding vector includes receiving an indication of the SVD precoding vector via a backhaul link.

In a fifteenth aspect, alone or in combination with one or more of the first through fourteenth aspects, the network entity is a first network entity, the backhaul link is a communication link between the first network entity and a second network entity, and receiving the indication of the SVD precoding vector includes receiving the indication of the SVD precoding vector from the second network entity via the backhaul link.

In a sixteenth aspect, alone or in combination with one or more of the first through fifteenth aspects, method 800 includes receiving UE capability information associated with a UE, the UE capability information specifies one or more supported frequency shifts. Method 800 further includes selecting a frequency shift from the one or more supported frequency shifts, and transmitting an indication of the frequency shift.

In a seventeenth aspect, alone or in combination with one or more of the first through sixteenth aspects, the UE is a first UE, the UE capability information is first UE capability information, the one or more supported frequency shifts are a first set of one or more supported frequency shifts, the frequency shift is a first frequency shift, the indication is a first indication, and method 800 includes receiving second UE capability information associated with a second UE, the second UE capability information specifying a second set of one or more supported frequency shifts, selecting a second frequency shift from the second set of one or more supported frequency shifts based at least in part on frequency division multiplexing the second frequency shift with the first frequency shift, and transmitting a second indication of the second frequency shift.

Note that FIG. 8 is just one example of a method, and other methods including fewer, additional, or alternative steps are possible consistent with this disclosure.

Figure 9:
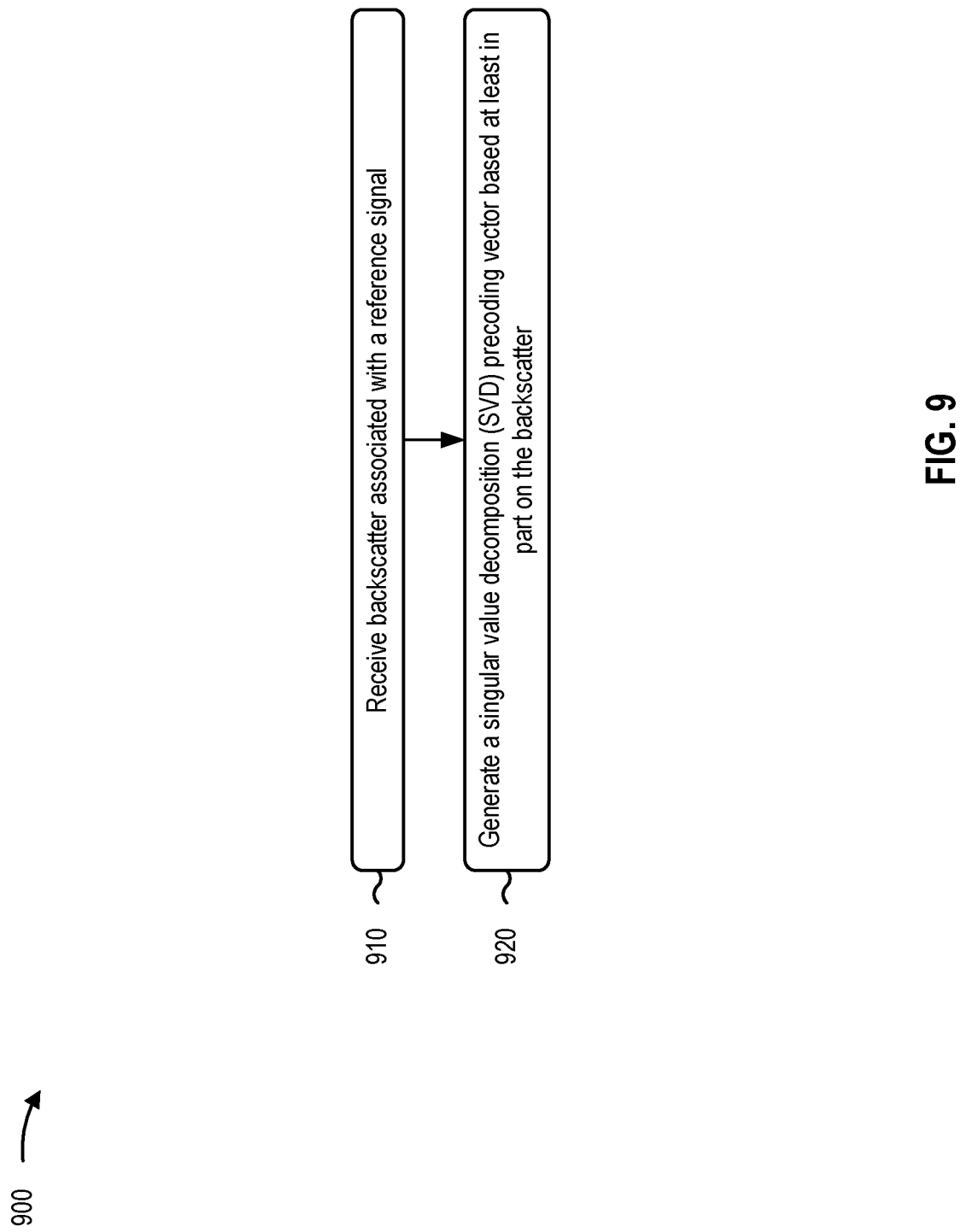
FIG. 9 shows a method for wireless communications by a network entity, in accordance with the present disclosure.

FIG. 9 shows a method 900 for wireless communications by a network entity, such as BS 110.

Method 900 begins at 910 with receiving backscatter associated with a reference signal.

Method 900 then proceeds to 920 with generating an SVD precoding vector based at least in part on the backscatter.

In a first aspect, method 900 includes transmitting an indication of the SVD precoding vector.

In a second aspect, alone or in combination with the first aspect, transmitting the indication of the SVD precoding vector includes transmitting the indication of the SVD precoding vector via a backhaul link.

In a third aspect, alone or in combination with one or more of the first and second aspects, the network entity is a second network entity, the backhaul link is a communication link between the second network entity and a first network entity, and transmitting the indication of the SVD precoding vector includes transmitting the indication of the SVD precoding vector to the first network entity via the backhaul link.

In a fourth aspect, alone or in combination with one or more of the first through third aspects, the SVD precoder vector is based at least in part on a matched filter.

In a fifth aspect, alone or in combination with one or more of the first through fourth aspects, the matched filter is based at least in part on the backscatter.

In a sixth aspect, alone or in combination with one or more of the first through fifth aspects, the matched filter is a uniform power matched filter that is configured to apply a commensurate amplitude level to a respective portion of an output signal transmitted by each antenna in a set of antennas.

In a seventh aspect, alone or in combination with one or more of the first through sixth aspects, the matched filter is configured to apply, for each antenna in a set of antennas, a respective phase shift and a respective amplitude level to a respective portion of an output signal transmitted by the antenna in the set of antennas.

In an eighth aspect, alone or in combination with one or more of the first through seventh aspects, the reference signal is a continuous wave.

In a ninth aspect, alone or in combination with one or more of the first through eighth aspects, the reference signal is a wideband transmission.

In a tenth aspect, alone or in combination with one or more of the first through ninth aspects, the wideband transmission includes an OFDM waveform.

In an eleventh aspect, alone or in combination with one or more of the first through tenth aspects, the wideband transmission includes two or more tones.

In a twelfth aspect, alone or in combination with one or more of the first through eleventh aspects, method 900 includes computing, based at least in part on the backscatter, a channel estimation matrix that is associated with a communication channel, and generating the SVD precoding vector is based at least in part on the channel estimation matrix.

In a thirteenth aspect, alone or in combination with one or more of the first through twelfth aspects, generating the SVD precoding vector includes computing a right eigenvector of an SVD representation of the communication channel based at least in part on the channel estimation matrix.

Note that FIG. 9 is just one example of a method, and other methods including fewer, additional, or alternative steps are possible consistent with this disclosure.

Figure 10:
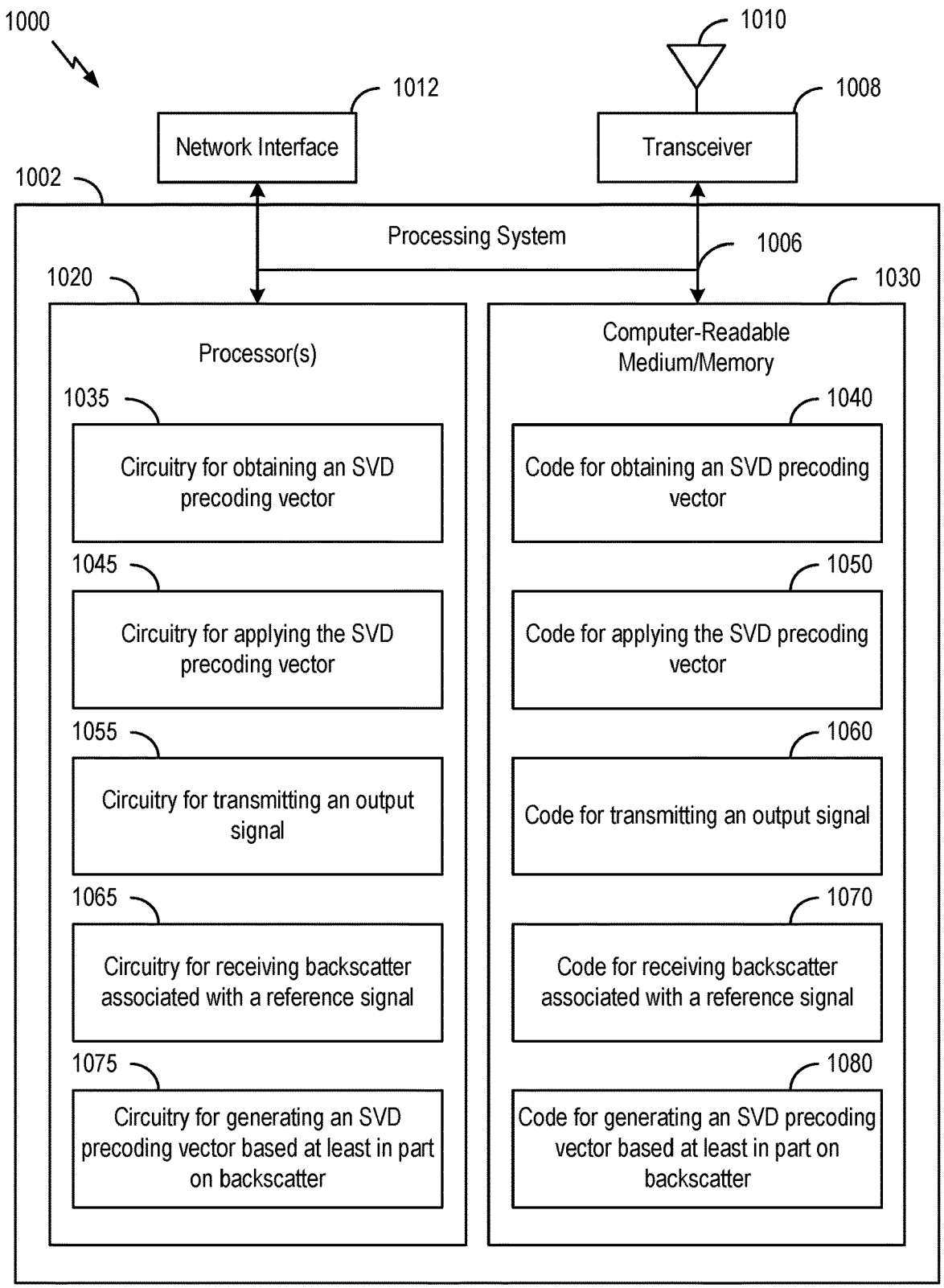
FIG. 10 is a diagram illustrating an example of an implementation of code and circuitry for a communications device, in accordance with the present disclosure.

FIG. 10 is a diagram illustrating an example of an implementation of code and circuitry for a communications device 1000, in accordance with the present disclosure. The communications device 1000 may be a network entity (such as BS 110 or a disaggregated base station as described with regard to FIG. 3), or a network entity may include the communications device 1000.

The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The network interface 1012 is configured to obtain and send signals for the communications device 1000 via communications link(s), such as a backhaul link, midhaul link, and/or fronthaul link as described herein, such as with respect to FIG. 3. The processing system 1002 may be configured to perform processing functions for the communications device 1000, including processing signals received and/or to be transmitted by the communications device 1000.

The processing system 1002 includes one or more processors 1020. In various aspects, the one or more processors 1020 may be representative of one or more of receive processor 238, transmit processor 220, TX MIMO processor 230, and/or controller/processor 240, as described with respect to FIG. 2. The one or more processors 1020 are coupled to a computer-readable medium/memory 1030 via a bus 1006. In various aspects, the computer-readable medium/memory 1030 may be representative of memory 242, as described with respect to FIG. 2. In certain aspects, the computer-readable medium/memory 1030 is configured to store instructions (e.g., computer-executable code, processor-executable code) that when executed by the one or more processors 1020, cause the one or more processors 1020 to perform the method 800 described with respect to FIG. 8 and/or the method 900 described with respect to FIG. 9, or any aspect related to them. Note that reference to a processor performing a function of communications device 1000 may include one or more processors performing that function of communications device 1000.

As shown in FIG. 10, the communications device 1000 may include circuitry for obtaining a SVD precoding vector that is based at least in part on backscatter associated with a reference signal transmitted by the network entity (circuitry 1035).

As shown in FIG. 10, the communications device 1000 may include, stored in computer-readable medium/memory 1030, code for obtaining an SVD precoding vector that is based at least in part on backscatter associated with a reference signal transmitted by the network entity (code 1040).

As shown in FIG. 10, the communications device 1000 may include circuitry for applying the SVD precoding vector to an output signal (circuitry 1045).

As shown in FIG. 10, the communications device 1000 may include, stored in computer-readable medium/memory 1030, code for applying the SVD precoding vector to an output signal (code 1050).

As shown in FIG. 10, the communications device 1000 may include circuitry for transmitting the output signal based at least in part on a set of antennas (circuitry 1055).

As shown in FIG. 10, the communications device 1000 may include, stored in computer-readable medium/memory 1030, code for transmitting the output signal based at least in part on a set of antennas (code 1060).

Alternatively or additionally, and as shown in FIG. 10, the communications device 1000 may include circuitry for receiving backscatter associated with a reference signal (circuitry 1065).

Alternatively or additionally, and as shown in FIG. 10, the communications device 1000 may include, stored in computer-readable medium/memory 1030, code for receiving backscatter associated with a reference signal (code 1070).

Alternatively or additionally, and as shown in FIG. 10, the communications device 1000 may include circuitry for generating an SVD precoding vector based at least in part on the backscatter (circuitry 1075).

Alternatively or additionally, and as shown in FIG. 10, the communications device 1000 may include, stored in computer-readable medium/memory 1030, code for generating an SVD precoding vector based at least in part on the backscatter (code 1080).

Various components of the communications device 1000 may provide means for performing the method 800 described with respect to FIG. 8 and/or the method 900 described with respect to FIG. 9, or any aspect related to it. For example, means for transmitting, sending, or outputting for transmission may include the transceiver(s) 232 and/or antenna(s) 234 of the network entity and/or transceiver 1008 and antenna 1010 of the communications device 1000 in FIG. 10. Means for receiving or obtaining may include the transceiver(s) 232 and/or antenna(s) 234 of the BS 110 and/or transceiver 1008 and antenna 1010 of the communications device 1000 in FIG. 10.

FIG. 10 is provided as an example. Other examples may differ from what is described in connection with FIG. 10.

The following provides an overview of some Aspects of the present disclosure:

Aspect 1: A method of wireless communication performed by a network entity, comprising: obtaining a singular value decomposition (SVD) precoding vector that is based at least in part on backscatter associated with a reference signal transmitted by the network entity; applying the SVD precoding vector to an output signal; and transmitting the output signal based at least in part on a set of antennas.

Aspect 2: The method of Aspect 1, wherein the SVD precoder vector is based at least in part on a matched filter.

Aspect 3: The method of Aspect 2, wherein the matched filter is based at least in part on the backscatter.

Aspect 4: The method of Aspect 2, wherein the matched filter comprises a uniform power matched filter that applies, for each antenna in the set of antennas, a commensurate amplitude level to a respective portion of the output signal transmitted by the antenna in the set of antennas.

Aspect 5: The method of Aspect 4, wherein the matched filter is configured to apply, for each antenna in the set of antennas, a respective phase shift to the respective portion of the output signal transmitted by the antenna in the set of antennas.

Aspect 6: The method of Aspect 2, wherein applying the SVD precoder vector comprises: applying, for each antenna in the set of antennas, a respective phase shift and a respective amplitude level to a respective portion of the output signal transmitted by the antenna in the set of antennas.

Aspect 7: The method of any of Aspects 1-6, further comprising: transmitting the reference signal based at least in part on the set of antennas.

Aspect 8: The method of Aspect 7, wherein the reference signal is a continuous wave.

Aspect 9: The method of Aspect 7, wherein the reference signal comprises a wideband transmission.

Aspect 10: The method of Aspect 9, wherein the wideband transmission comprises an orthogonal frequency division multiplexing (OFDM) waveform.

Aspect 11: The method of Aspect 9, wherein the wideband transmission comprises two or more tones.

Aspect 12: The method of Aspect 7, further comprising: receiving the backscatter based at least in part on transmitting the reference signal, wherein obtaining the SVD precoding vector comprises: generating the SVD precoding vector based at least in part on the backscatter. wherein obtaining the SVD precoding vector comprises: generating the SVD precoding vector based at least in part on the backscatter.

Aspect 13: The method of Aspect 12, further comprising: computing a channel estimation matrix that is associated with a communication channel based at least in part on the backscatter, wherein generating the SVD precoding vector is based at least in part on the channel estimation matrix.

Aspect 14: The method of Aspect 13, wherein generating the SVD precoding vector further comprises: computing, based at least in part on the channel estimation matrix, a right eigenvector of an SVD representation of the communication channel.

Aspect 15: The method of any of Aspects 1-14, wherein obtaining the SVD precoding vector comprises: receiving an indication of the SVD precoding vector via a backhaul link.

Aspect 16: The method of Aspect 15, wherein the network entity is a first network entity, wherein the backhaul link is a communication link between the first network entity and a second network entity, and wherein receiving the indication of the SVD precoding vector comprises: receiving the indication of the SVD precoding vector from the second network entity via the backhaul link.

Aspect 17: The method of any of Aspects 1-16, further comprising: receiving user equipment (UE) capability information associated with a UE, the UE capability information specifying one or more supported frequency shifts; selecting a frequency shift from the one or more supported frequency shifts; and transmitting an indication of the frequency shift.

Aspect 18: The method of Aspect 17, wherein the UE is a first UE, the UE capability information is first UE capability information, the one or more supported frequency shifts are a first set of one or more supported frequency shifts, the frequency shift is a first frequency shift, the indication is a first indication, and the method further comprises: receiving second UE capability information associated with a second UE, the second UE capability information specifying a second set of one or more supported frequency shifts; selecting a second frequency shift from the second set of one or more supported frequency shifts based at least in part on frequency division multiplexing the second frequency shift with the first frequency shift; and transmitting a second indication of the second frequency shift.

Aspect 19: A method of wireless communication performed by a network entity, comprising: receiving backscatter associated with a reference signal; and generating a singular value decomposition (SVD) precoding vector based at least in part on the backscatter.

Aspect 20: The method of Aspect 19, further comprising: transmitting an indication of the SVD precoding vector.

Aspect 21: The method of Aspect 20, wherein transmitting the indication of the SVD precoding vector comprises: transmitting the indication of the SVD precoding vector via a backhaul link.

Aspect 22: The method of Aspect 21, wherein the network entity is a second network entity, wherein the backhaul link is a communication link between the second network entity and a first network entity, and wherein transmitting the indication of the SVD precoding vector comprises: transmitting the indication of the SVD precoding vector to the first network entity via the backhaul link.

Aspect 23: The method of any of Aspects 19-22, wherein the SVD precoder vector is based at least in part on a matched filter.

Aspect 24: The method of Aspect 23, wherein the matched filter is based at least in part on the backscatter.

Aspect 25: The method of Aspect 23, wherein the matched filter comprises a uniform power matched filter that is configured to apply a commensurate amplitude level to a respective portion of an output signal transmitted by each antenna in a set of antennas.

Aspect 26: The method of Aspect 23, wherein the matched filter is configured to apply, for each antenna in a set of antennas, a respective phase shift and a respective amplitude level to a respective portion of an output signal transmitted by the antenna in the set of antennas.

Aspect 27: The method of any of Aspects 19-26, wherein the reference signal is a continuous wave.

Aspect 28: The method of Aspect 27, wherein the reference signal comprises a wideband transmission.

Aspect 29: The method of Aspect 28, wherein the wideband transmission comprises an orthogonal frequency division multiplexing (OFDM) waveform.

Aspect 30: The method of Aspect 28, wherein the wideband transmission comprises two or more tones.

Aspect 31: The method of any of Aspects 19-30, further comprising: computing, based at least in part on the backscatter, a channel estimation matrix that is associated with a communication channel, wherein generating the SVD precoding vector is based at least in part on the channel estimation matrix.

Aspect 32: The method of Aspect 31, wherein generating the SVD precoding vector further comprises: computing a right eigenvector of an SVD representation of the communication channel based at least in part on the channel estimation matrix.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a network entity, comprising:
   a memory; and
   one or more processors, coupled to the memory, configured to:
      obtain a singular value decomposition (SVD) precoding vector that is based at least in part on backscatter associated with a reference signal transmitted by the network entity;
      apply the SVD precoding vector to an output signal; and
      transmit the output signal based at least in part on a set of antennas.

2. The apparatus of claim 1, wherein the SVD precoder vector is based at least in part on a matched filter.

3. The apparatus of claim 2, wherein the matched filter comprises a uniform power matched filter configured to apply, for each antenna in the set of antennas, a commensurate amplitude level to a respective portion of the output signal transmitted by the antenna in the set of antennas.

4. The apparatus of claim 2, wherein the matched filter is configured to:
   apply, for each antenna in the set of antennas, a respective phase shift and a respective amplitude level to a respective portion of the output signal transmitted by the antenna in the set of antennas.

5. The apparatus of claim 1, wherein the one or more processors are further configured to:
   transmit the reference signal based at least in part on the set of antennas.

6. The apparatus of claim 5, wherein the reference signal is a continuous wave.

7. The apparatus of claim 5, wherein the reference signal comprises a wideband transmission.

8. The apparatus of claim 7, wherein the wideband transmission comprises an orthogonal frequency division multiplexing (OFDM) waveform.

9. The apparatus of claim 7, wherein the wideband transmission comprises two or more tones.

10. The apparatus of claim 5, wherein the one or more processors are further configured to:
    receive the backscatter based at least in part on transmission of the reference signal by the network entity,
    wherein the one or more processors, to obtain the SVD precoding vector, are configured to:
       generate the SVD precoding vector based at least in part on the backscatter.

11. The apparatus of claim 10, wherein the one or more processors are further configured to:
    compute a channel estimation matrix that is associated with a communication channel based at least in part on the backscatter,
    wherein, to generate the SVD precoder vector, the one or more processors are further configured to:
       generate the SVD precoding vector based at least in part on the channel estimation matrix.

12. The apparatus of claim 11, wherein the one or more processors, to generate the SVD precoding vector, are configured to:
    compute, based at least in part on the channel estimation matrix, a right eigenvector of an SVD representation of the communication channel.

13. The apparatus of claim 1, wherein the one or more processors, to obtain the SVD precoding vector, are configured to:
receive an indication of the SVD precoding vector via a backhaul link.

14. The apparatus of claim 1, wherein the one or more processors are further configured to:
receive user equipment (UE) capability information that is associated with a UE and specifies one or more supported frequency shifts;
select a frequency shift from the one or more supported frequency shifts; and
transmit an indication of the frequency shift.

15. The apparatus of claim 14, wherein the frequency shift is a first frequency shift, and
wherein the one or more processors are further configured to:
receive second UE capability information that is associated with a second UE and specifies a second set of one or more supported frequency shifts that are supported by the second UE;
select a second frequency shift from the second set of one or more supported frequency shifts based at least in part on frequency division multiplexing the second frequency shift with the first frequency shift; and
transmit a second indication of the second frequency shift.

16. An apparatus for wireless communication at a network entity, comprising:
a memory; and
one or more processors, coupled to the memory, configured to:
receive backscatter associated with a reference signal; and
generate a singular value decomposition (SVD) precoding vector based at least in part on the backscatter.

17. The apparatus of claim 16, wherein the one or more processors are further configured to:
transmit an indication of the SVD precoding vector.

18. The apparatus of claim 17, wherein the one or more processors, to transmit the indication of the SVD precoding vector, are configured to:
transmit the indication of the SVD precoding vector via a backhaul link.

19. The apparatus of claim 16, wherein the SVD precoder vector is based at least in part on a matched filter.

20. The apparatus of claim 19, wherein the matched filter is based at least in part on the backscatter.

21. The apparatus of claim 19, wherein the matched filter comprises a uniform power matched filter that is configured to apply a commensurate amplitude level to a respective portion of an output signal transmitted by each antenna in a set of antennas.

22. The apparatus of claim 19, wherein the matched filter is configured to apply, for each antenna in a set of antennas, a respective phase shift and a respective amplitude level to a respective portion of an output signal transmitted by the antenna.

23. The apparatus of claim 16, wherein the reference signal is a continuous wave.

24. The apparatus of claim 16, wherein the reference signal comprises a wideband transmission.

25. The apparatus of claim 24, wherein the wideband transmission comprises an orthogonal frequency division multiplexing (OFDM) waveform.

26. The apparatus of claim 24, wherein the wideband transmission comprises two or more tones.

27. The apparatus of claim 16, wherein the one or more processors are further configured to:
compute, based at least in part on the backscatter, a channel estimation matrix that is associated with a communication channel,
wherein, to generate the SVD precoder vector, the one or more processors are further configured to:
generate the SVD precoding vector based at least in part on the channel estimation matrix.

28. The apparatus of claim 27, wherein the one or more processors, to generate the SVD precoding vector, are configured to:
compute a right eigenvector of an SVD representation of the communication channel based at least in part on the channel estimation matrix.

29. A method of wireless communication performed by a network entity, comprising:
obtaining a singular value decomposition (SVD) precoding vector that is based at least in part on backscatter associated with a reference signal transmitted by the network entity;
applying the SVD precoding vector to an output signal; and
transmitting the output signal based at least in part on a set of antennas.

30. A method of wireless communication performed by a network entity, comprising:
receiving backscatter associated with a reference signal; and
generating a singular value decomposition (SVD) precoding vector based at least in part on the backscatter.

* * * * *